US012144463B1

(12) United States Patent
Campbell

(10) Patent No.: US 12,144,463 B1
(45) Date of Patent: Nov. 19, 2024

(54) GRILL GRATE-OILING DEVICE

(71) Applicant: William Campbell, Bismark, ND (US)

(72) Inventor: William Campbell, Bismark, ND (US)

( * ) Notice: Subject to any disclaimer, the term of this patent is extended or adjusted under 35 U.S.C. 154(b) by 0 days.

(21) Appl. No.: 18/414,608

(22) Filed: Jan. 17, 2024

Related U.S. Application Data

(63) Continuation-in-part of application No. 17/706,713, filed on Mar. 29, 2022, now Pat. No. 11,918,145.

(51) Int. Cl.
| | | |
|---|---|---|
| *A47J 37/07* | (2006.01) | |
| *A46B 11/00* | (2006.01) | |
| *B05C 1/02* | (2006.01) | |
| *B05C 9/02* | (2006.01) | |

(52) U.S. Cl.
CPC ......... *A47J 37/0786* (2013.01); *B05C 1/025* (2013.01); *A46B 11/0013* (2013.01); *B05C 9/02* (2013.01)

(58) Field of Classification Search
CPC ...... A47J 37/0786; B05C 1/025; B05C 17/00; B05C 17/002; B05C 17/003; B05C 9/02; A46B 11/001; A46B 11/0013; A46B 11/0062; A46B 2200/20; A47L 13/13; A47L 13/26
USPC .......................... 401/264, 263, 261, 205–207
See application file for complete search history.

(56) References Cited

U.S. PATENT DOCUMENTS

| | | | |
|---|---|---|---|
| 247,488 | A * | 9/1881 | Elliott |
| 4,166,626 | A * | 9/1979 | Sandor ................. G11B 3/589 |
| | | | 401/206 |
| 4,993,859 | A * | 2/1991 | Assad .................. B65D 47/44 |
| | | | 401/206 |
| 5,015,112 | A | 5/1991 | Arnold |
| 6,210,064 | B1 * | 4/2001 | White ............... A46B 11/0062 |
| | | | 401/279 |
| D674,671 | S | 1/2013 | Borovicka |
| 8,672,572 | B1 | 3/2014 | Almada |
| 8,961,054 | B2 | 2/2015 | Gilbert |
| 9,474,416 | B2 | 10/2016 | Zarinkia |
| 9,675,209 | B2 | 6/2017 | Roth |
| 2005/0207820 | A1 | 2/2005 | Franczak |

FOREIGN PATENT DOCUMENTS

WO       2015126445       8/2015

* cited by examiner

*Primary Examiner* — David J Walczak
(74) *Attorney, Agent, or Firm* — Kyle A. Fletcher, Esq.

(57) ABSTRACT

The grill grate-oiling device includes a main body, an applicator, and a valve. The grill grate-oiling device may be operable to apply oil to grates of a grill in order to prevent food from sticking to the grates. The grill grate-oiling device may be spill resistant if tipped or knocked over. The oil may be held within the main body and may flow from the main body into the applicator. Responsive to the main body being pressed downward, the valve may open to allow the oil to flow to an applicator pad located on the bottom of the applicator. The oil may be applied to the grates by rubbing the applicator pad over the grates.

18 Claims, 8 Drawing Sheets

GRILL GRATE-OILING DEVICE

CROSS REFERENCES TO RELATED APPLICATIONS

This continuation-in-part patent application claims priority to U.S. non-provisional patent application Ser. No. 17/706,713 that was filed on Mar. 29, 2022 by the applicant, Mr. William Campbell.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of grilling utensils, more specifically, a grill grate-oiling device.

SUMMARY OF INVENTION

The grill grate-oiling device comprises a main body, an applicator, and a valve. The grill grate-oiling device may be operable to apply oil to grates of a grill in order to prevent food from sticking to the grates. The grill grate-oiling device may be spill resistant if tipped or knocked over. The oil may be held within the main body and may flow from the main body into the applicator. Responsive to the main body being pressed downward, the valve may open to allow the oil to flow to an applicator pad located on the bottom of the applicator. The oil may be applied to the grates by rubbing the applicator pad over the grates.

An object of the invention is to apply oil to the grates of a grill in a safe, sanitary, and efficient manner.

Another object of the invention is to dispense oil contained within a main body through a spring-loaded valve when the main body is pressed downward.

A further object of the invention is to apply the oil to the grates via a heat-resistant applicator.

Yet another object of the invention is to prevent spills when the invention is upright, tipped, or knocked over.

These together with additional objects, features and advantages of the grill grate-oiling device will be readily apparent to those of ordinary skill in the art upon reading the following detailed description of the presently preferred, but nonetheless illustrative, embodiments when taken in conjunction with the accompanying drawings.

In this respect, before explaining the current embodiments of the grill grate-oiling device in detail, it is to be understood that the grill grate-oiling device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the grill grate-oiling device.

It is therefore important that the claims be regarded as including such equivalent construction insofar as they do not depart from the spirit and scope of the grill grate-oiling device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
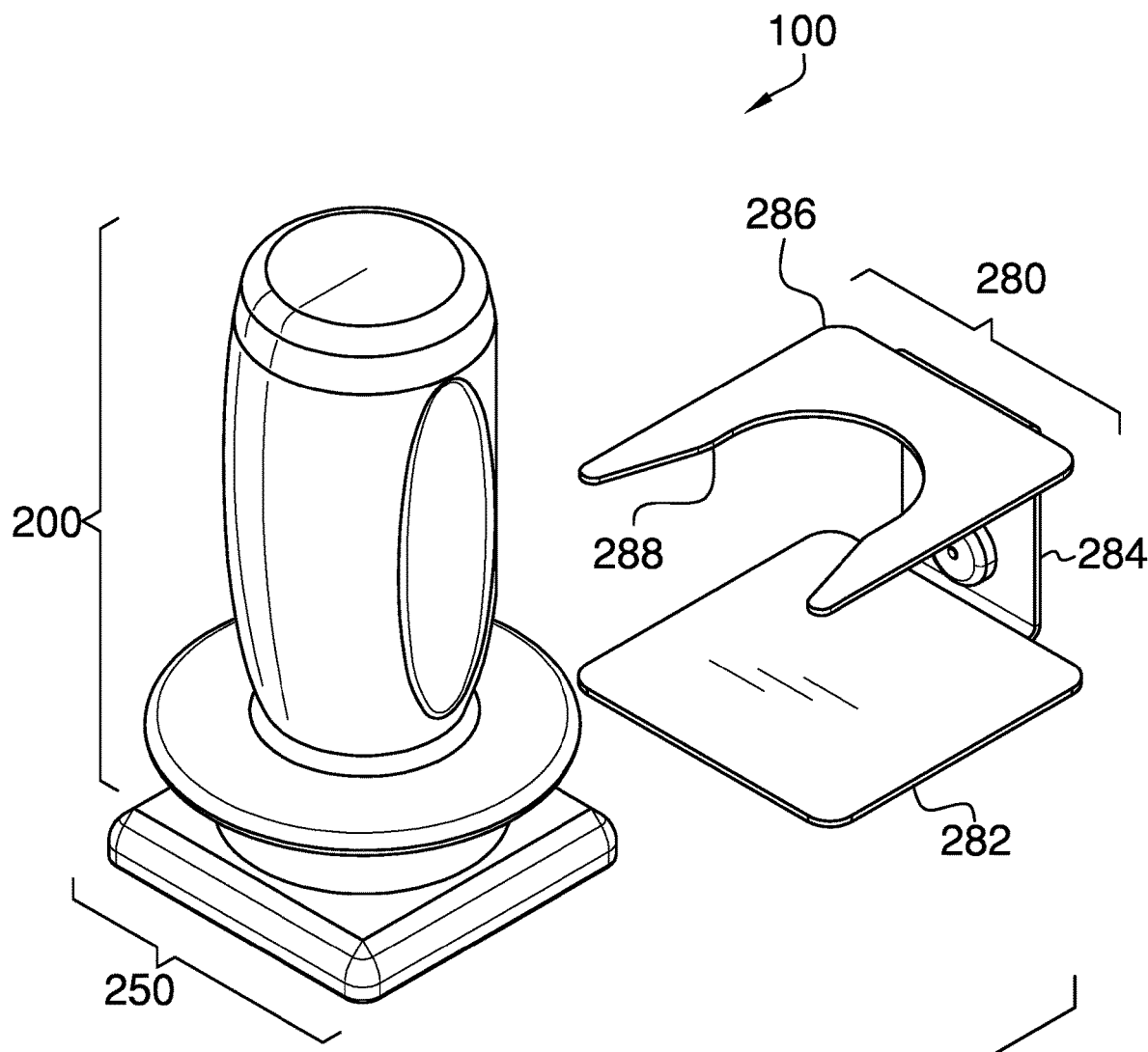
FIG. 1 is a top isometric view of an embodiment of the disclosure.
Figure 2:
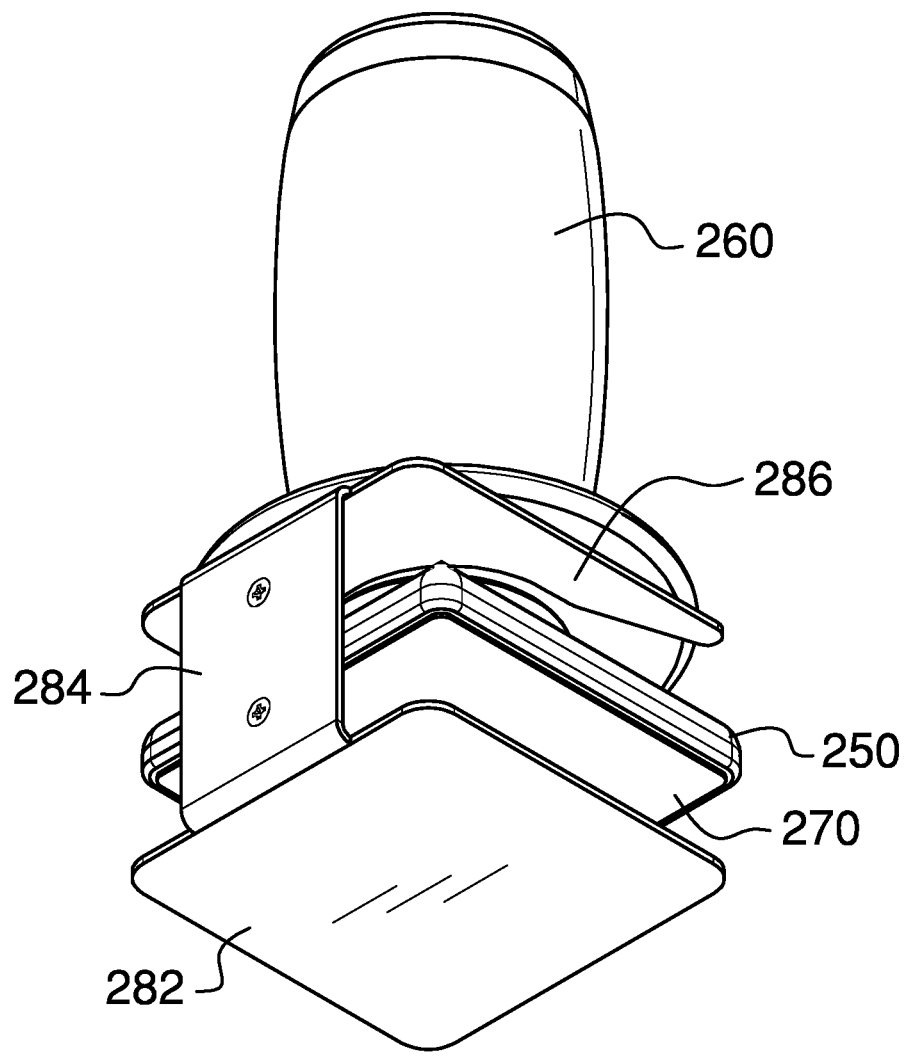
FIG. 2 is a bottom isometric view of an embodiment of the disclosure.
Figure 3:
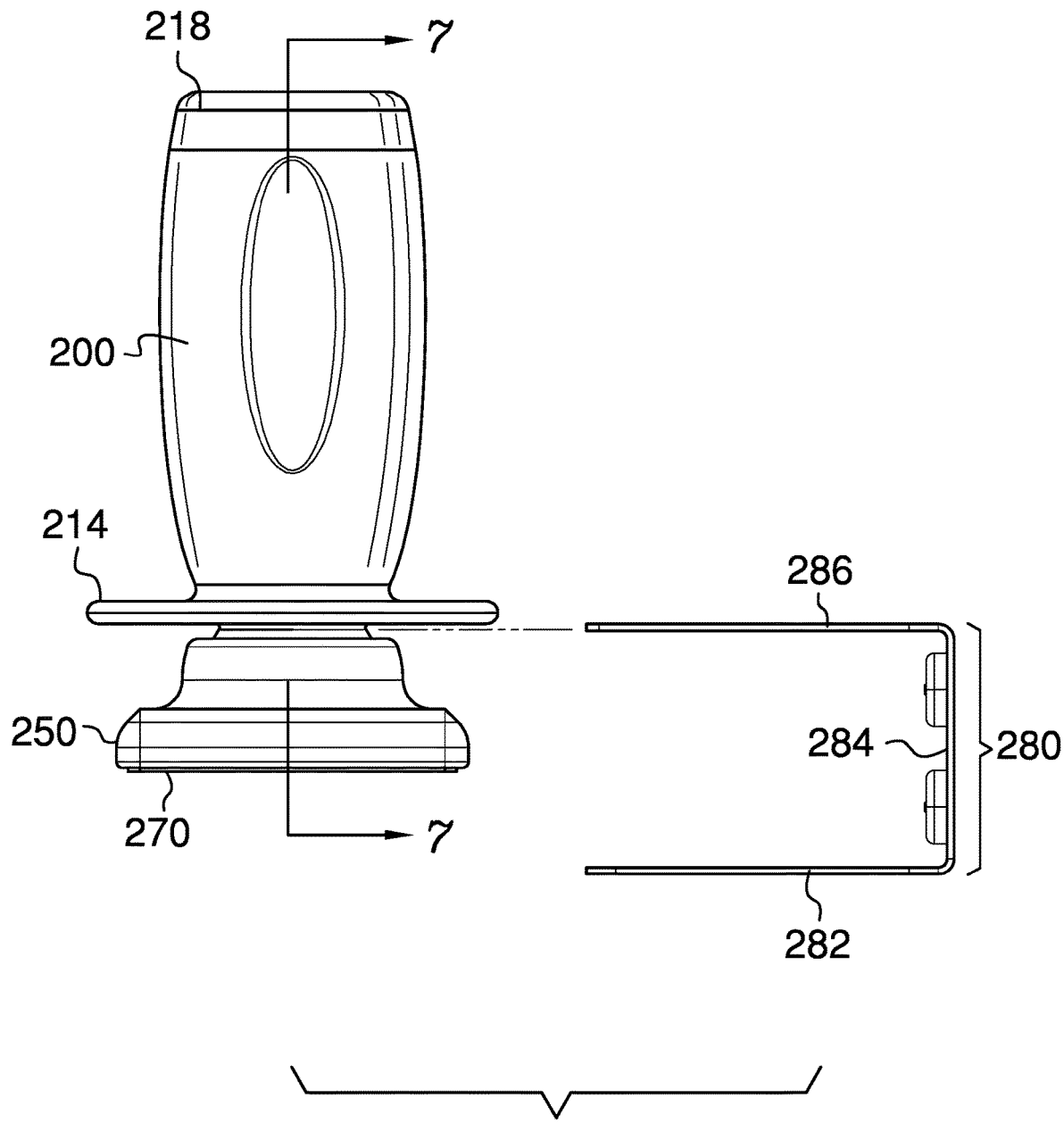
FIG. 3 is a front view of an embodiment of the disclosure.
Figure 4:
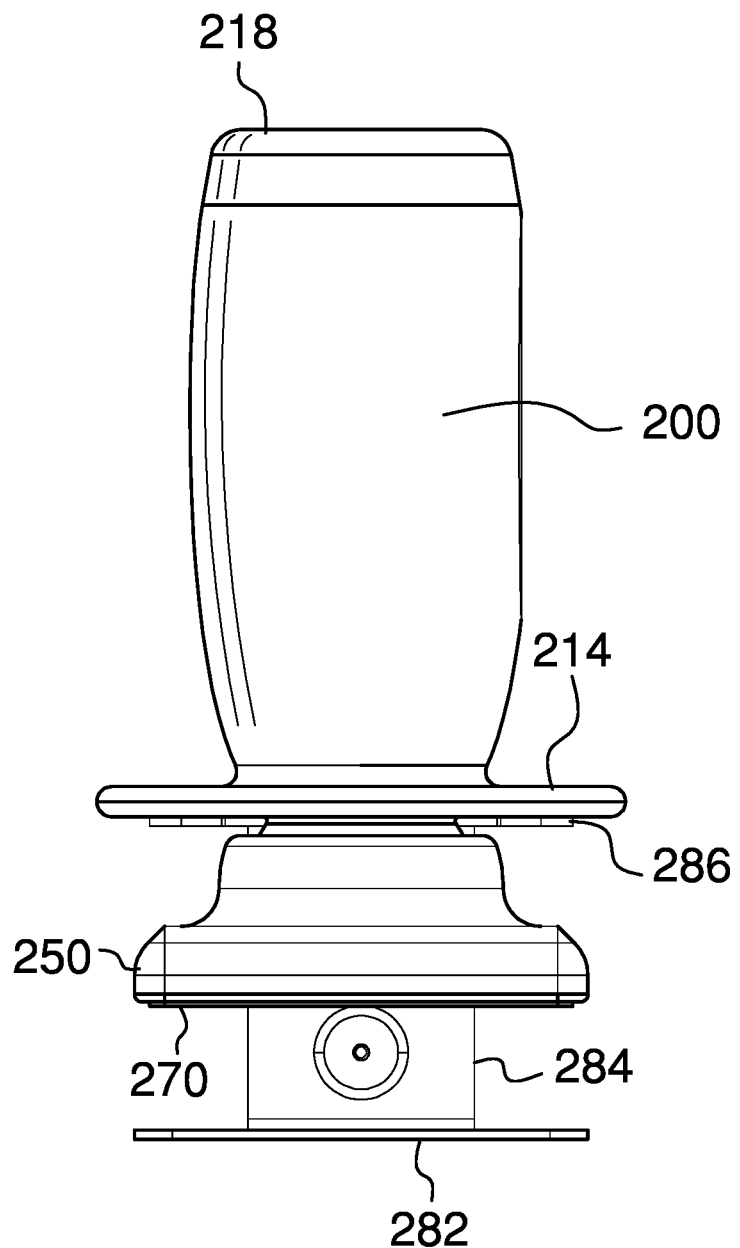
FIG. 4 is a side view of an embodiment of the disclosure.
Figure 5:
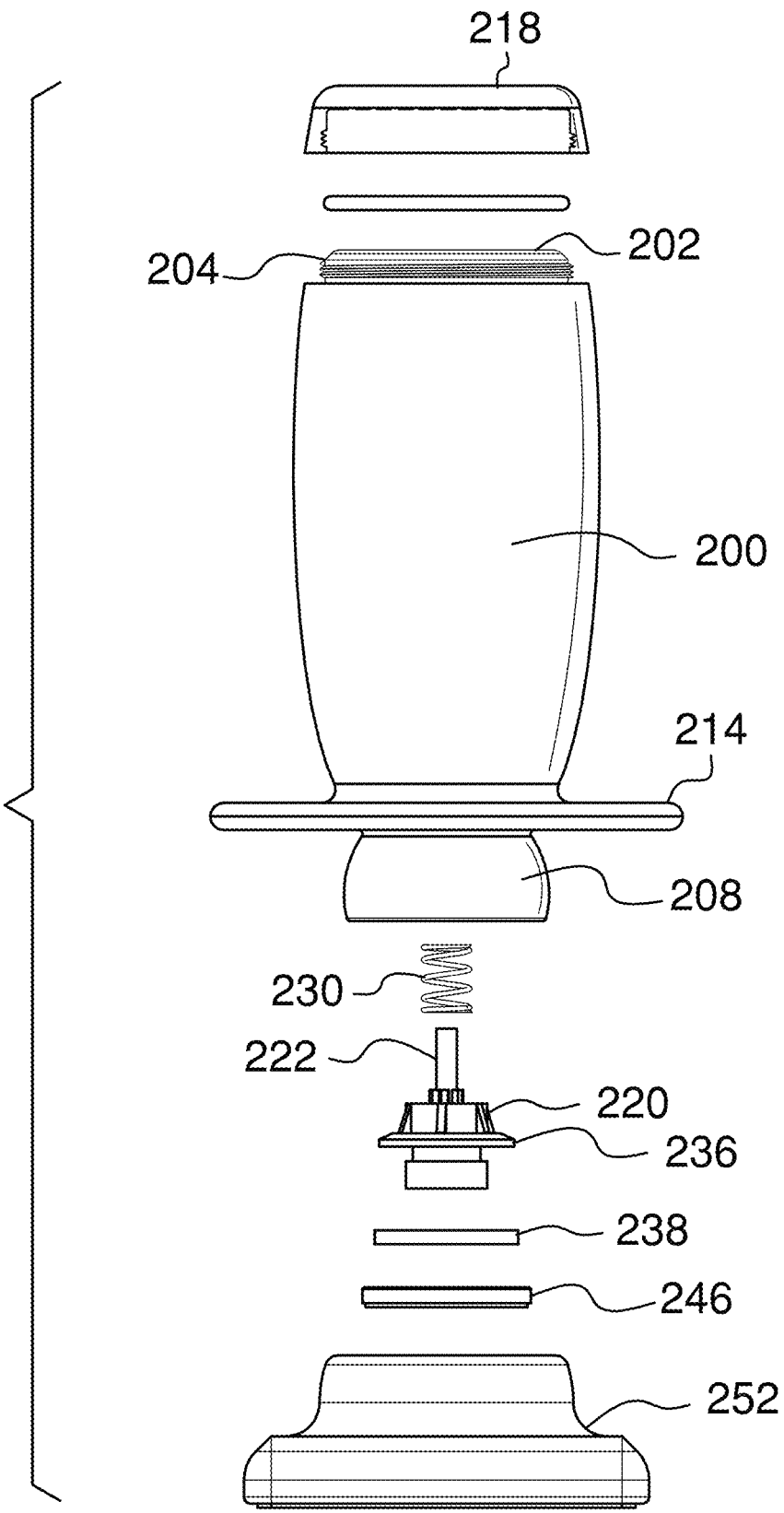
FIG. 5 is an exploded rear view of an embodiment of the disclosure.
Figure 6:
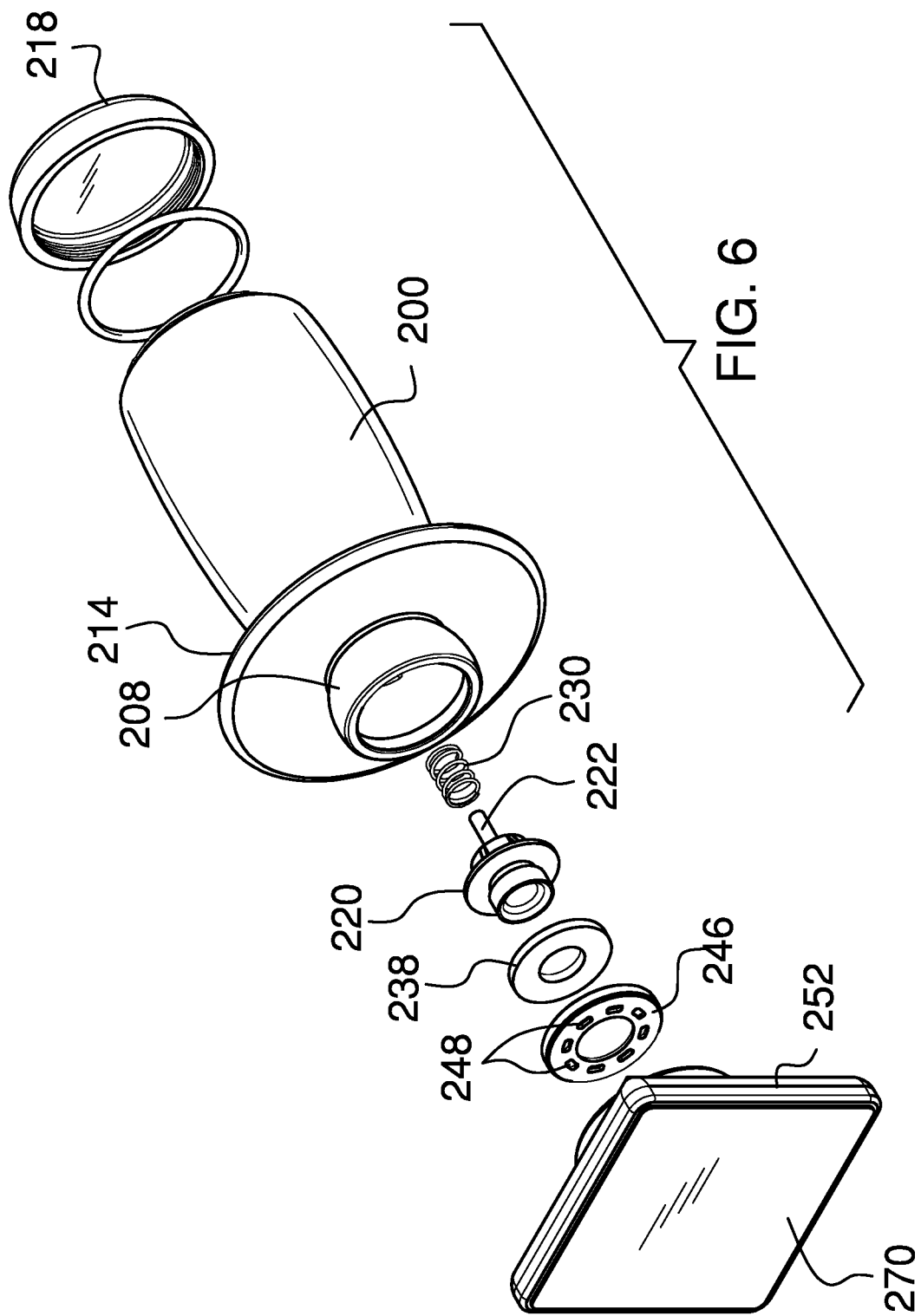
FIG. 6 is an exploded isometric view of an embodiment of the disclosure.
Figure 7:
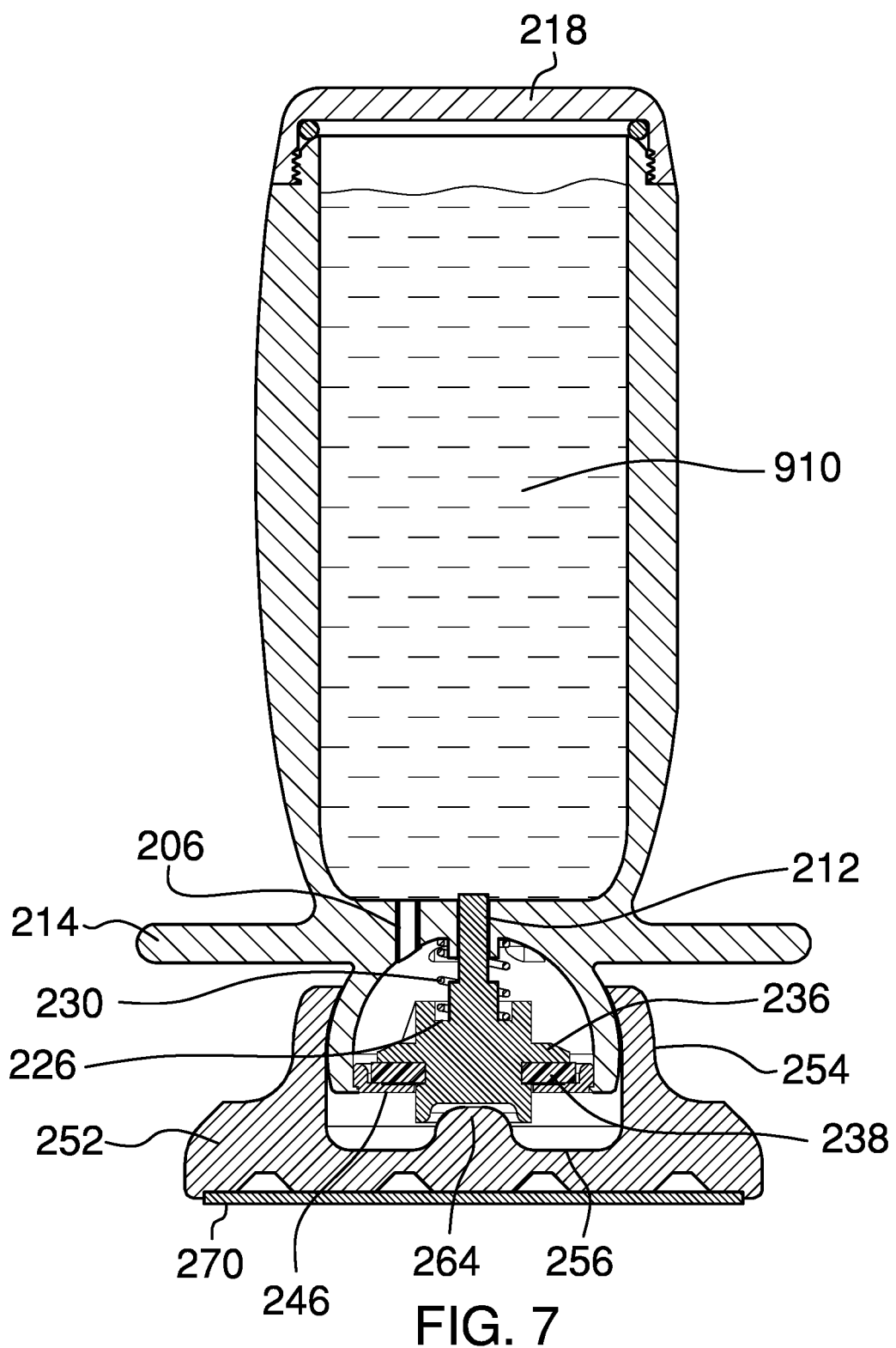
FIG. 7 is a cross-sectional view of an embodiment of the disclosure across 7-7 as shown in FIG. 3, illustrating the valve closed.
Figure 8:
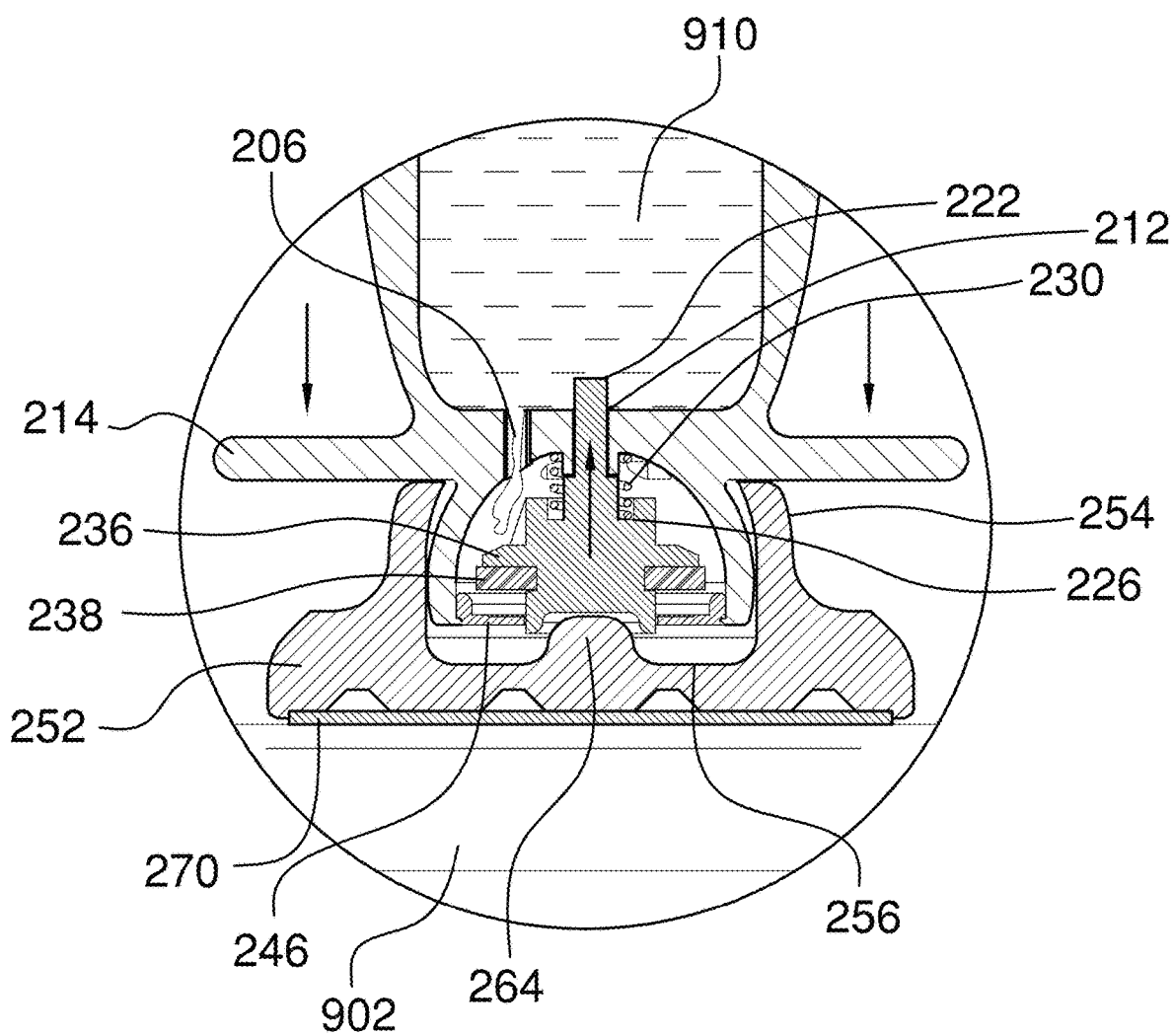
FIG. 8 is a detail cross-sectional view of an embodiment of the disclosure, illustrating the valve open.

Detailed reference will now be made to a first potential embodiment of the disclosure, which is illustrated in FIGS. 1 through 8.

The grill grate-oiling device 100 (hereinafter invention) comprises a main body 200, an applicator 250, and a valve 220. The invention 100 may be operable to apply oil 910 to grates 902 of a grill in order to prevent food from sticking to the grates 902. The invention 100 may be spill resistant if tipped or knocked over. The oil 910 may be held within the main body 200 and may flow from the main body 200 into the applicator 250. Responsive to the main body 200 being pressed downward, the valve 220 may open to allow the oil 910 to flow to an applicator pad 270 located on the bottom of the applicator 250. The oil 910 may be applied to the grates 902 by rubbing the applicator pad 270 over the grates 902.

The main body 200 may comprise a hollow container for storing the oil 910 that is to be dispensed onto the grates 902. The main body 200 may comprise a refill aperture 202 located at the top of the main body 200. The oil 910 may be added to the main body 200 through the refill aperture 202. A cap 218 may screw onto a threaded collar 204 surrounding the refill aperture 202 to cover the refill aperture 202 in order to prevent spills. The cap 218 may be removed for refilling the main body 200 and replaced in preparation for use.

The main body 200 may comprise a valve guide aperture 212 located at the bottom center of the main body 200. The valve guide aperture 212 may guide vertical movements of the valve 220. The main body 200 may comprise an outflow aperture 206 located at the bottom of the main body 200 and separated from the valve guide aperture 212. The oil 910 may flow out of the main body 200 via the outflow aperture 206.

The main body 200 may comprise a cowl 208 located at the bottom of the main body 200. The cowl 208 may be a flared bottom of the main body 200. The cowl 208 may be operable to couple the main body 200 to the applicator 250. The cowl 208 may have a circular footprint.

The applicator 250 may comprise an applicator body 252 and the applicator pad 270. The applicator body 252 may comprise a coupling wall 254 that encircles the top of the applicator body 252 to form a coupling well 256. The coupling wall 254 and the coupling well 256 may be circular as seen from above. The coupling wall 254 may be sized to encompass the cowl 208 of the main body 200 when the applicator 250 is mated to the main body 200 such that the cowl 208 of the main body 200 fits into the coupling well 256. The coupling well 256 may have straight vertical sides such that the cowl 208 may slide vertically within the coupling well 256. The coupling wall 254 may slidably couple the applicator 250 to the main body 200. The coupling well 256 includes a channel (not shown) that enables the oil 910 to pass through the applicator body 252, and into the applicator pad 270.

The bottom center of the coupling well 256 may comprise a lifting knob 264 that projects upward. The lifting knob 264 may be operable to lift the valve 220 as the main body 200 is pressed down into the applicator 250. In some embodiments, the top of the lifting knob 264 may be rounded such that a dispensing angle of the main body 200 relative to the applicator 250 may change by tilting the main body 200. When the main body 200 is tilted, the cowl 208 may rotate within the coupling wall 254 and the bottom of the valve 220 may slide over the rounded top of the lifting knob 264 to accommodate the dispensing angle.

The applicator pad 270 may couple to the bottom of the applicator body 252. The applicator pad 270 may be a heat-resistant pad for applying the oil 910 to the grates 902. The applicator pad 270 may be supplied with the oil 910 from above as the oil 910 flows through dispenser ring apertures 248 of a dispenser ring 246.

The valve 220 may block the flow of the oil 910 out the applicator body 252 to the applicator pad 270. The valve 220 may comprise a valve flange 236. The valve flange 236 may project laterally away from the body of the valve 220 and may form the widest portion of the valve 220. The bottom of the valve flange 236 may be coupled to a valve seal 238. The valve 220 may have a circular footprint.

A depression in the top of the valve 220 may form a spring well 226 to retain the bottom of a spring 230. A valve guide 222 may project upwards from the center of the spring well 226 through the center of the spring 230. The valve guide 222 may pass through the valve guide aperture 212 and into the main body 200. The valve guide 222 may guide the vertical motions of the valve 220 relative to the main body 200.

The valve 220 may further comprise the dispenser ring 246. The dispenser ring 246 may couple to the bottom of the cowl 208. The dispenser ring 246 may comprise the dispenser ring apertures 248 through which the oil 910 may flow in order to pass from the main body 200 to the applicator 250.

The valve 220 may further comprise the spring 230. The spring 230 may be made from an elastic material and may store mechanical energy. The spring 230 may be helical in shape and may comprise a default length when no external forces are exerted on the spring 230. The spring 230 may be compressed between the valve 220 and the bottom of the main body 200. The spring 230 may force the valve 220 downwards to prevent the oil 910 from flowing to the applicator pad 270.

With the valve 220 closed, the dispenser ring apertures 248 may be blocked by the valve seal 238 to prevent the flow of the oil 910. With the valve 220 open, the valve seal 238 may be removed from the dispenser ring 246 such that the oil 910 may flow through the dispenser ring apertures 248. The valve 220 may be opened by applying a downward force on the main body 200 to push the valve 220 against the lifting knob 264 such that the valve 220 is lifted and the valve seal 238 separates from the dispenser ring 246 to uncover the dispenser ring apertures 248. The valve 220 may be closed by removing the downward force on the main body 200 such that the spring 230 may push the valve 220 downward to press the valve seal 238 against the dispenser ring 246 and cover the dispenser ring apertures 248.

In a preferred embodiment, the spring 230 may be made of zinc-plated steel wire and the applicator pad 270 may be made of ceramic fiber. The main body 200, the cap 218, the valve 220, or any combination thereof may be made from polydicyclopentadiene (PDCPD) or other heat-resistant plastic.

A stand 280 may be operable to hold the invention 100 off of the grates 902 such that the invention 100 is within reach of a user when needed. The stand 280 may comprise a base panel 282, an upright panel 284, and a top panel 286. The top panel 286 and the base panel 282 may be held separate and parallel by the upright panel 284. The top panel 286 may comprise a stand notch 288 to receive the main body 200 and to support the main body 200 by a collar 214. The stand 280 may rest on the base panel 282 or the upright panel 284 may be mounted to a wall.

In use, the main body 200 may be filled with oil 910 by unscrewing the cap 218, pouring the oil 910 into the main body 200 through the refill aperture 202, and screwing the cap 218 back on. The invention 100 may stand on the applicator pad 270 when not in use or may be retained in the stand 280. Whether standing or laying on the side, the oil 910 will not leak. To apply the oil 910 to the grates 902, the applicator pad 270 may be placed on the grates 902, the main body 200 may be pressed down to release the oil 910 into the applicator pad 270 and the applicator pad 270 may be rubbed over the grates 902. In some embodiments, the dispensing angle may made altered by tilting the main body 200 relative to the applicator 250. Changing the dispensing angle may make the main body 200 more comfortable to hold.

As non-limiting examples, the oil 910 may be a cooking oil having a high smoke point temperature such as canola oil, peanut oil, vegetable oil, sunflower oil, and avocado oil.

CROSS-REFERENCE TO RELATED APPLICATION

This application is a continuation-in-part of U.S. application Ser. No. 17/706,713, filed 29 Mar. 2022, which is incorporated by reference herein in its entirety.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface or object. Aperture may be synonymous with hole, slit, crack, gap, slot, or opening.

As used in this disclosure, a "collar" may be a ring like device that is placed around an object.

As used herein, the words "couple", "couples", "coupled" or "coupling", may refer to connecting, either directly or indirectly, and does not necessarily imply a mechanical connection.

As used in this disclosure, "elastic" may refer to a material or object that deforms when a force is applied to stretch or compress the material and that returns to its relaxed shape after the force is removed. A material that exhibits these qualities is also referred to as an elastomeric material.

As used herein, "filling", or "refilling", may refer to the act of placing a first item into a second item whether the quantity of the first item fills the second item or not. As non-limiting examples, the first item may be a liquid, such as water, oil, or gasoline, or a granulated solid, such as sand or coffee beans. As non-limiting examples, the second item may be a bin, a bottle, a tank, or another type of container.

As used in this disclosure, a "flange" may be a protruding rib, edge, or collar that is used to hold an object in place or to attach a first object to a second object.

As used here, "footprint" may refer to a projection of an object onto the surface that supports the object. The projection is usually, but not always, vertically downward.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "grate" may be a plurality of parallel metal bars or a metal structure comprising a mesh structure formed from metal bars.

As used in this disclosure, a "helix" may be the three dimensional structure that is formed by a wire that is wound uniformly around the surface of a cylinder or a cone. If the wire is wrapped around a cylinder the helix is called a cylindrical helix. If the wire is wrapped around a cone, the helix is called a conical helix. "Helical" may be an adjective which indicates that an object is shaped like a helix.

As used in this disclosure, the word "lateral" may refer to the sides of an object or movement towards a side. Lateral directions are generally perpendicular to longitudinal directions. "Laterally" may refer to movement in a lateral direction.

As used herein, "mate" may refer to a retaining, coupling, connecting, interlocking, or interfacing at a predefined interface.

As used in this disclosure, a "notch" may be an indentation formed in an edge or a cavity or aperture formed within a surface.

As used herein, "PDCPD" or "polydicyclopentadiene" may refer to a thermosetting plastic that can replace metal, fiberglass, and a number of polymers due to its unique properties. PDCPD plastic may exhibit high impact resistance, high chemical corrosion resistance, and high Heat Deflection Temperature.

As used in this disclosure, the term "rounded" may refer to the replacement of an apex, vertex, edge, or brink of a structure with a (generally smooth) curvature wherein the concave portion of the curvature faces the interior or center of the structure.

As used in this disclosure, a "spring" may be a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, a "valve" may be a device that is used to control the flow of a fluid, either gas or liquid, through a pipe or tubing or to control the flow of a fluid into and out of a container. Some valves may have multiple ports and may allow the diverting or mixing of fluids. "Check valve" may refer to a valve that is operable to pass a fluid in one direction only, thus preventing backflow of the fluid.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A grill grate-oiling device comprising:
   a main body, and an applicator;
   wherein the grill grate-oiling device is operable to apply oil to grates of a grill in order to prevent food from sticking to the grates;
   wherein the grill grate-oiling device is spill resistant;
   wherein the oil is held within the main body and flows from the main body into the applicator;
   wherein the oil is applied to the grates by rubbing the applicator over the grates;
   wherein the main body comprises a hollow container for storing the oil that is to be dispensed onto the grates;
   wherein responsive to the main body being pressed downward, a valve opens to allow the oil to flow to an applicator pad located on a bottom of the applicator;
wherein the main body comprises a cowl located at a bottom of the main body;
wherein the applicator comprises an applicator body and the applicator pad;
wherein the applicator body comprises a coupling wall that encircles a top of the applicator body to form a coupling well;
wherein the coupling wall and the coupling well are circular as seen from above;
wherein the coupling wall is sized to encompass the cowl of the main body when the applicator is mated to the main body such that the cowl of the main body fits into the coupling well;
wherein the coupling well has straight vertical sides such that the cowl slides vertically within the coupling well;
wherein the coupling wall slidably couples the applicator to the main body.

2. The grill grate-oiling device according to claim 1 wherein the main body comprises a refill aperture located at a top of the main body;
wherein the oil is added to the main body through the refill aperture.

3. The grill grate-oiling device according to claim 2 wherein a cap screws onto a threaded collar surrounding the refill aperture to cover the refill aperture in order to prevent spills;
wherein the cap is removed for refilling the main body and replaced in preparation for use.

4. The grill grate-oiling device according to claim 3 wherein the main body comprises a valve guide aperture located at a bottom center of the main body;
wherein the valve guide aperture guides vertical movements of the valve.

5. The grill grate-oiling device according to claim 4 wherein the main body comprises an outflow aperture located at the bottom of the main body and separated from the valve guide aperture;
wherein the oil flows out of the main body via the outflow aperture.

6. The grill grate-oiling device according to claim 5 wherein the cowl is a flared bottom of the main body;
wherein the cowl is operable to couple the main body to the applicator;
wherein the cowl has a circular footprint.

7. The grill grate-oiling device according to claim 6 wherein the bottom center of the coupling well comprises a lifting knob that projects upward;
wherein the lifting knob is operable to lift the valve as the main body is pressed down into the applicator.

8. The grill grate-oiling device according to claim 7 wherein a top of the lifting knob is rounded such that a dispensing angle of the main body relative to the applicator changes by tilting the main body.

9. The grill grate-oiling device according to claim 7 wherein the applicator pad couples to a bottom of the applicator body;
wherein the applicator pad is a heat-resistant pad for applying the oil to the grates;
wherein the applicator pad is supplied with the oil from above as the oil flows through dispenser ring apertures of a dispenser ring.

10. The grill grate-oiling device according to claim 9 wherein the valve blocks the flow of the oil out the applicator body to the applicator pad;
wherein the valve comprises a valve flange;
wherein the valve flange projects laterally away from the body of the valve and forms the widest portion of the valve;
wherein the bottom of the valve flange is coupled to a valve seal;
wherein the valve has a circular footprint.

11. The grill grate-oiling device according to claim 10 wherein a depression in the top of the valve forms a spring well to retain the bottom of a spring.

12. The grill grate-oiling device according to claim 11 wherein a valve guide projects upwards from a center of the spring well through a center of the spring;
wherein the valve guide passes through the valve guide aperture and into the main body;
wherein the valve guide guides the vertical motions of the valve relative to the main body.

13. The grill grate-oiling device according to claim 12 wherein the valve further comprises the dispenser ring;
wherein the dispenser ring couples to a bottom of the cowl;
wherein the dispenser ring comprises the dispenser ring apertures through which the oil flows in order to pass from the main body to the applicator.

14. The grill grate-oiling device according to claim 13 wherein the valve further comprises the spring;
wherein the spring is made from an elastic material and stores mechanical energy;
wherein the spring is helical in shape and comprises a default length when no external forces are exerted on the spring;
wherein the spring is compressed between the valve and the bottom of the main body;
wherein the spring forces the valve downwards to prevent the oil from flowing to the applicator pad.

15. The grill grate-oiling device according to claim 14 wherein with the valve closed, the dispenser ring apertures are blocked by the valve seal to prevent the flow of the oil;
wherein with the valve open, the valve seal is removed from the dispenser ring such that the oil flows through the dispenser ring apertures.

16. The grill grate-oiling device according to claim 15 wherein the valve is opened by applying a downward force on the main body to push the valve against the lifting knob such that the valve is lifted and the valve seal separates from the dispenser ring to uncover the dispenser ring apertures;
wherein the valve is closed by removing the downward force on the main body such that the spring pushes the valve downward to press the valve seal against the dispenser ring and cover the dispenser ring apertures.

17. The grill grate-oiling device according to claim 16 wherein the spring is made of zinc-plated steel wire and the applicator pad is made of ceramic fiber;
wherein the main body, the cap, the valve, or any combination thereof are made from PDCPD plastic.

18. The grill grate-oiling device according to claim 16 wherein a stand is operable to hold the grill grate-oiling device off of the grates;
wherein the stand comprises a base panel, an upright panel, and a top panel;
wherein the top panel and the base panel are held separate and parallel by the upright panel;
wherein the top panel comprises a stand notch to receive the main body and to support the main body by a collar;

wherein the stand rests on the base panel or the upright panel is mounted to a wall.

\* \* \* \* \*